United States Patent [19]

Uno

[11] Patent Number: 5,619,262
[45] Date of Patent: Apr. 8, 1997

[54] SOLID-STATE IMAGE PICKUP APPARATUS INCLUDING A UNIT CELL ARRAY

[75] Inventor: Masayuki Uno, Ina, Japan

[73] Assignee: Olympus Optical Co., Ltd., Tokyo, Japan

[21] Appl. No.: 552,477

[22] Filed: Nov. 9, 1995

[30] Foreign Application Priority Data

Nov. 18, 1994 [JP] Japan ................................. 6-308435

[51] Int. Cl.⁶ ....................................................... H04N 3/14
[52] U.S. Cl. ............................................. 348/297; 348/308
[58] Field of Search ................................... 348/297, 302, 348/308, 304, 294; 257/229; 250/208.1

[56] References Cited

U.S. PATENT DOCUMENTS

| | | | |
|---|---|---|---|
| 4,890,164 | 12/1989 | Takei et al. | 348/297 |
| 4,974,093 | 11/1990 | Murayama et al. | 348/308 |
| 5,012,344 | 4/1991 | Goto | 348/297 |
| 5,479,208 | 12/1995 | Okumura | 348/308 |

*Primary Examiner*—Wendy Garber
*Attorney, Agent, or Firm*—Armstrong, Westerman, Hattori, McLeland & Naughton

[57] ABSTRACT

A unit cell array is formed of unit cells arranged one-dimensionally or two-dimensionally, each unit cell having a photodiode, and first and second switches with one terminal of each switch connected to the photodiode. The other terminals of the first switches of the unit cells are connected to integrators that detect the integrated value of the charge generated by the incident light into the photodiodes, and the other terminals of the second switches of the unit cells are commonly connected to a signal line. The other end of the signal line is connected to a current detector that detects, as a current value, charge generated by light incident to the unit cell array. This arrangement results in a solid-state image pickup apparatus which is provided with means integrated on-chip with a sensor and operated within the same power supply voltage range as the sensor, and capable of detecting brightness on the sensor.

26 Claims, 10 Drawing Sheets

FIG. 1

PRIOR ART

FIG.10F
Sout

FIG. 11

SOLID-STATE IMAGE PICKUP APPARATUS INCLUDING A UNIT CELL ARRAY

BACKGROUND OF THE INVENTION

1. Field of the Invention

The present invention relates to a solid-state image pickup apparatus such as a line sensor which is constructed of unit cells, each containing a photodiode, arranged in a one-dimensional array and an area sensor which is constructed of unit cells arranged in a two-dimensional array, and in particular to a solid-state image pickup apparatus that offers optimum output in response to objects having a wide range of brightness.

2. Description of the Related Art

Solid-state image pickup apparatuses today have found applications in a diversity of fields. For example, video movie cameras and still video cameras use area sensors, and copying machines, facsimiles, and scanners employ line sensors. A line sensor is also used in the autofocusing device in a camera.

As digital technique today is in widespread use, these systems digitize the output from a solid-state pickup apparatus by means of an A/D converter before signal processing, and most of the A/D converters are of an 8-bit type. The 8-bit quantization is the minimum gradation required in handling image data. To achieve this level of gradation, the output of a sensor should appropriately match the input range of the A/D converter.

In copying machines, facsimiles, scanners and the like among the above applications, the position of an object is fixed and a constant light source is employed to illuminate the object. Thus, it is relatively easy to obtain the optimum sensor output that matches the input range of the A/D converter.

In video movie cameras, still video cameras, and the autofocusing device of camera, the brightness range of objects is wide. To adapt to the wide brightness range, diaphragm is controlled, exposure time (integrating time) is controlled by an electronic shutter, or the gain of a gain control amplifier disposed between the output of the sensor and the input of the A/D converter is controlled.

Figure 1:
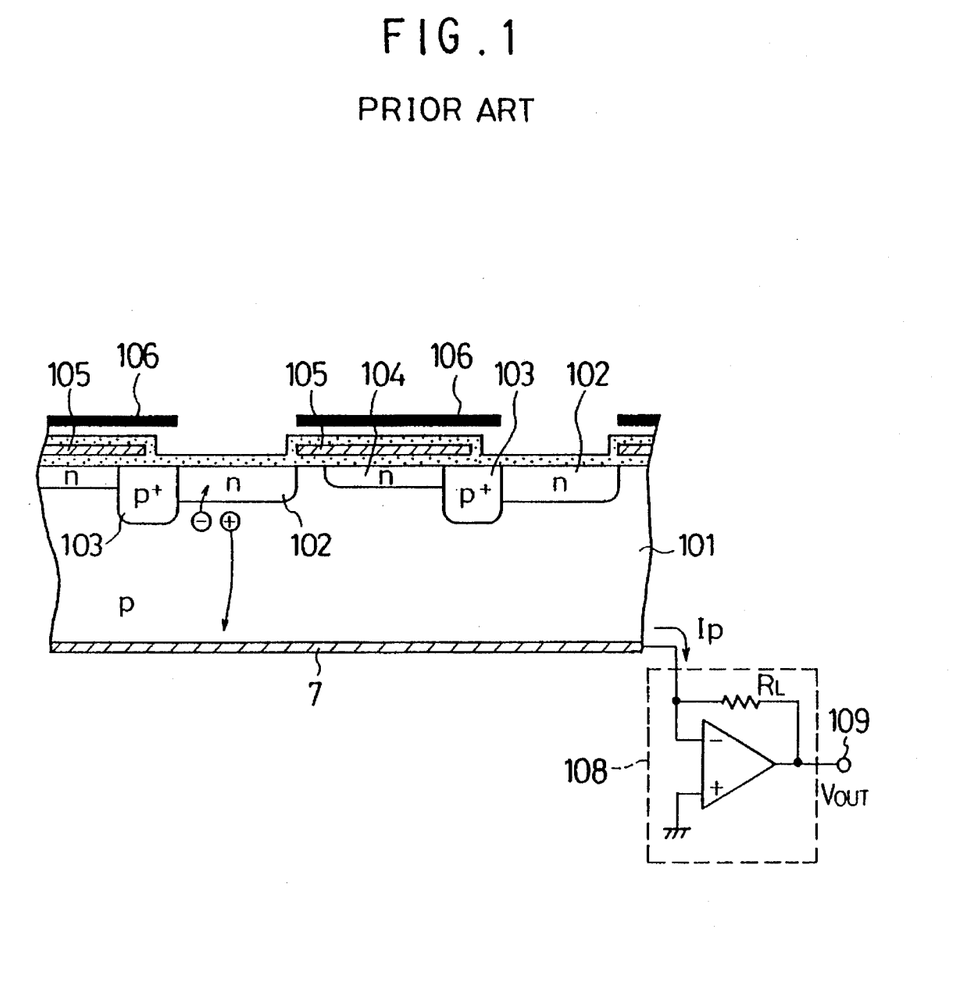
FIG. 1 shows the structure of the prior art CCD solid-state image pickup apparatus.

To achieve the above controlling, the brightness of an object should be accurately measured. To this end, Japanese Patent Application Laid-open No. Hei-4-255184 has disclosed the following solid-state image pickup apparatus. The disclosure is summarized as follows: out of the electron-hole pairs that are generated when light enters the solid-state image pickup apparatus, carriers having a polarity opposite to that of carriers accumulated in pixels are detected as a current, and that current is used as exposure information. FIG. 1 shows the construction of the disclosure in CCD-type solid-state image pickup apparatus.

Shown in FIG. 1 are a p-type substrate 101, an n-type diffusion layer 102 that forms photodiode of pixels, a p-type channel stop diffusion layer 103 for pixel isolation, a transfer CCD 104, and a control electrode 105 for the transfer CCD 104. The transfer CCD 104 is covered with a light cutting film 106, and lets in light to a pn-junction photodiode portion only.

In the CCD-type solid-state image pickup apparatus thus constructed, a substrate electrode 107 formed beneath the substrate 101 to keep the substrate 101 biased is electrically connected to the chip mount surface of the package of an image pickup device, and is further connected to one of the output pin terminals of the package. This terminal is typically connected to a power supply or ground to keep the substrate biased. In this example, however, to measure a current value, the terminal is connected to a current-voltage conversion amplifier 108, which constitutes exposure detecting means. The substrate electrode 107 is connected to the negative terminal of the current-voltage conversion amplifier 108. The negative terminal is biased at the same voltage as the positive terminal of the amplifier because of virtual ground. The output terminal 109 gives an output voltage $V_{OUT}$ expressed by the following equation (1).

$$V_{OUT} = V_{SUB} - (I_P + I_{OF}) \cdot R_L \tag{1}$$

where $V_{SUB}$ is the voltage of the substrate, $I_P$ is a photocurrent responsive to the quantity of incident light, $I_{OF}$ is an offset current that flows under dark conditions, and $R_L$ is the feedback resistor of the current-voltage conversion amplifier 108. As understood from the equation (1), the output voltage $V_{OUT}$ contains information indicative of the quantity of incident light. When the offset current $I_{OF}$ is sufficiently smaller than the photocurrent $I_P$, the equation (1) is approximated by the following equation (2).

$$V_{OUT} \approx V_{SUB} - I_P \cdot R_L \tag{2}$$

Diaphragm, integrating time, or gain of the gain control amplifier may be controlled based on the output voltage $V_{OUT}$ that varies with the photocurrent $I_P$.

The above disclosed solid-state image pickup apparatus suffers the following problems. First, the current-voltage conversion amplifier in FIG. 1 cannot be designed to be on-chip on a sensor that underwent standard manufacturing process. This is because although the substrate voltage $V_{SUB}$ in the solid-state image pickup apparatus in FIG. 1 should be biased at the lowest possible voltage relative to signal voltages handled on the chip, the output voltage $V_{OUT}$ is lower than the substrate voltage $V_{SUB}$ because the current due the output voltage is sunk. As a result, the output voltage $V_{OUT}$ is the one that cannot be handled on the sensor chip.

Second, the range of the power supply in the system is widened. The solid-state image pickup apparatus in FIG. 1 in its operation needs a positive power supply relative to the substrate voltage, while the current-voltage conversion amplifier needs a negative power supply. This widens the range of voltage required. The range of the power supply typically available in the standard system may not meet the voltage range requirement of FIG. 1.

Figure 2:
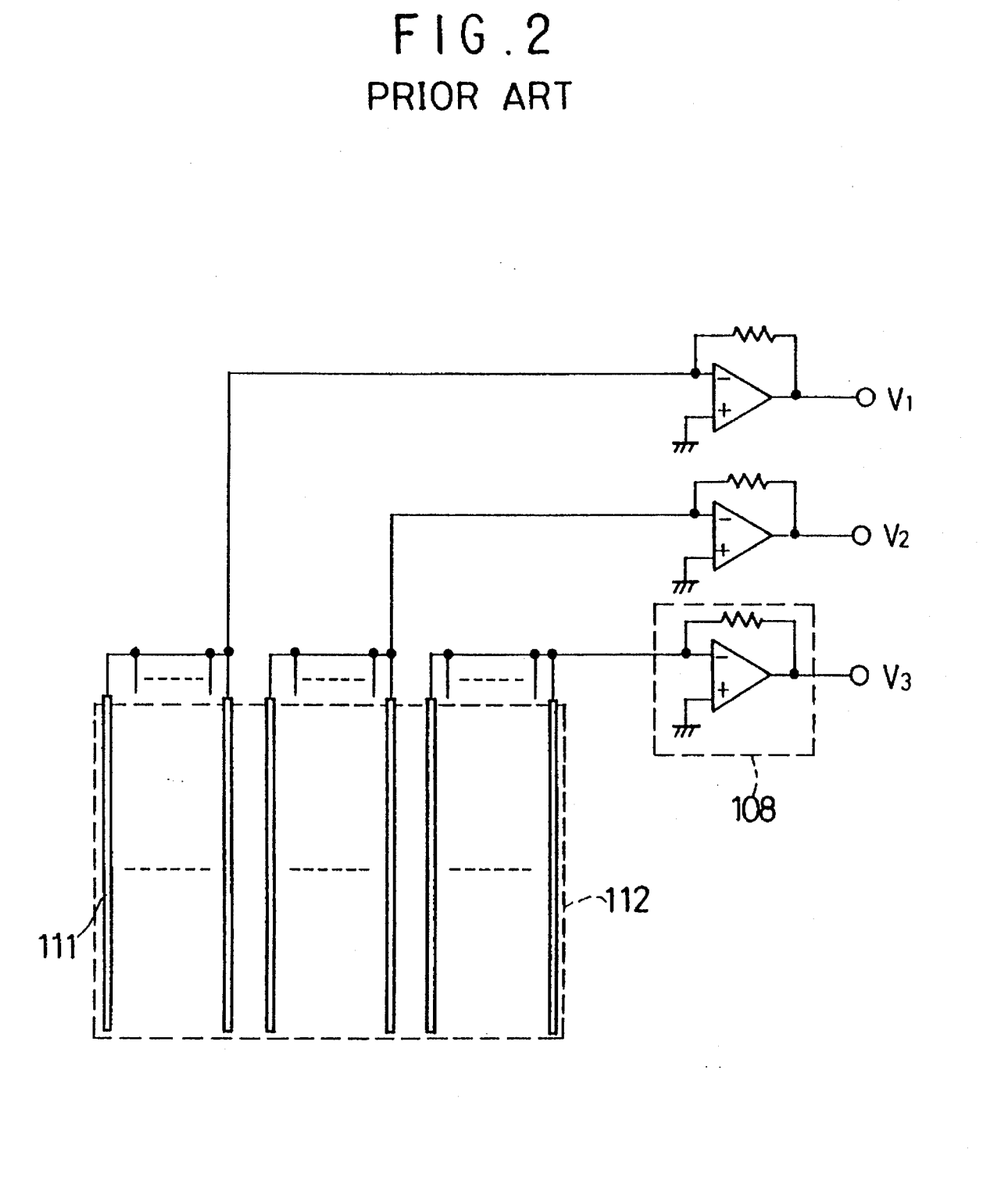
FIG. 2 shows the structure of the prior art CCD solid-state image pickup apparatus for collecting block-basis information.

Third, it is difficult to get outputs from blocks arbitrarily divided on the sensor. The above cited disclosure gives an embodiment, in which outputs are obtained from substrate electrodes divided into a plurality of portions as shown in FIG. 2. In FIG. 2, designated 111 are channel stop diffusion regions formed between a plurality of divided blocks, and designated 112 is an image pickup surface.

To achieve the object of the above cited embodiment, however, the current-voltage conversion amplifier should be completely free from offset voltage. If the current-voltage conversion amplifiers suffer from offset voltages, and the offset voltages are not balanced between the plurality of amplifiers, voltages relative to the substrate electrodes are different. Inter-block currents take place, leading to erroneous components. Blocks are not precisely divided. Therefore, block division turns out to be difficult.

SUMMARY OF THE INVENTION

The present invention has been developed to resolve the above problems, and it is a first object of the present invention to provide a solid-state image pickup apparatus which has means integrated on-chip with a sensor for measuring brightness on the sensor and operated within the same power supply voltage range as the sensor, said sensor being divisible into arbitrary blocks. It is a second object of the present invention to provide a solid-state image pickup apparatus which is provided with control means for controlling integrating time and gain so that the output of the sensor is optimized in response to obtained brightness information. It is a third object of the present invention to provide a solid-state image pickup apparatus which prevents photodiodes constituting a sensor from saturating due to photocurrent.

To achieve the above objects, the present invention comprises a unit cell array formed of unit cells arranged one-dimensionally or two-dimensionally, each unit cell having a photodiode, and first and second switches with one terminal of each switch connected to the photodiode, whereby the other terminals of the first switches of the unit cells are connected to integrators that detect the integrated value of the charge generated by the incident light into the photodiodes, the other terminals of the second switches of the unit cells are commonly connected to a signal line or the other terminals of the second switches are commonly connected to signal lines on a block-by-block basis when the unit array is divided into a plurality of blocks, and the other ends of the signal lines are commonly connected to a current detector that detects, as a current value, charge generated by light incident to the unit cells.

In the solid-state image pickup apparatus thus constructed, the current detector for detecting an average brightness on the unit cell array is integrated on-chip with the unit cell array for detecting an integrated value on a cell-by-cell basis, and the integrators and the current detector handle charges of the same polarity. Therefore, both the integrators and the current detector are operated from the same power supply. Since the other terminals of the second switches are connected together on a block-by-block basis, the unit cell array is divided into a plurality of blocks in an arbitrary manner.

DETAILED DESCRIPTION OF THE PREFERRED EMBODIMENTS

Figure 3:
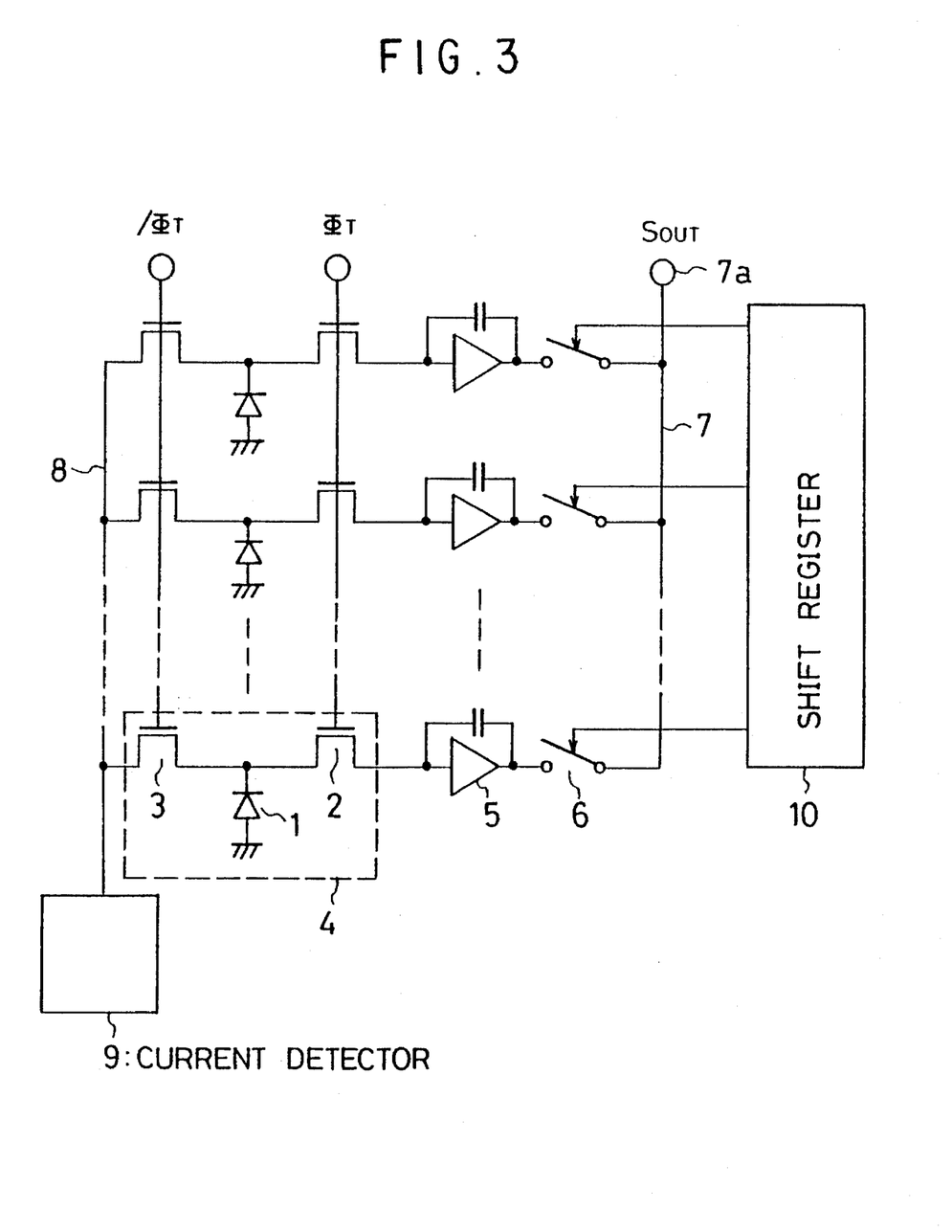
FIG. 3 is a schematic diagram showing a first embodiment of the solid-state image pickup apparatus according to the present invention.

The embodiments of the present invention are now discussed. FIG. 3 is the schematic diagram of the first embodiment, wherein the present invention is embodied into a line sensor constructed of one-dimensionally arranged photodiodes. Shown in FIG. 3 arena photodiode 1, switching transistors 2, 3, each having one terminal connected to the photodiode 1 and controlled for ON/OFF operation by control signals $\Phi_T$, /$\Phi_T$ (denoting an inverted signal of $\Phi_T$). These components constitute a unit cell 4. Unit cells 4, one-dimensionally arranged, constitute a unit cell array. The other terminal of the switching transistor 2 in each unit cell 4 is connected to the input terminal of the integrator 5 for accumulating charge generated by light, and the output terminal of the integrator 5 is connected to an output signal line 7 via a selection switch 6. When the selection switch 6 is driven by making a shift register 10 to scan, the output of each integrator 5 is readout via the output terminal 7a of the output signal line 7. The other terminal of the switching transistor 3 is connected to a current reading signal line 8, which in turn is connected to a current detector 9.

The operation of the first embodiment thus constructed is now discussed. Driving control signal / $\Phi_T$ high and control signal $\Phi_T$ low, the current detector 9 detects an averaged illuminance on the surface of the one-dimensional unit cell array to determine an integrating time. Next, by driving control signal / $\Phi_T$ low and control signal $\Phi_T$ high, integral operation of photoelectrically generated current is performed. When the integrating time determined by the current detector 9 elapses, the control signal $\Phi_T$ is driven low, causing the integrating operation to stop. The output $S_{OUT}$ of each unit cell 4 is readout via the output terminal 7a by causing the shift register 10 to scan. Since the above arrangement allows the current detector 9 to detect the sum of light incident to the unit cells 4, on-chip integral control is made possible by forming a computing circuit on a chip that also mounts the unit cell array.

Figure 4:
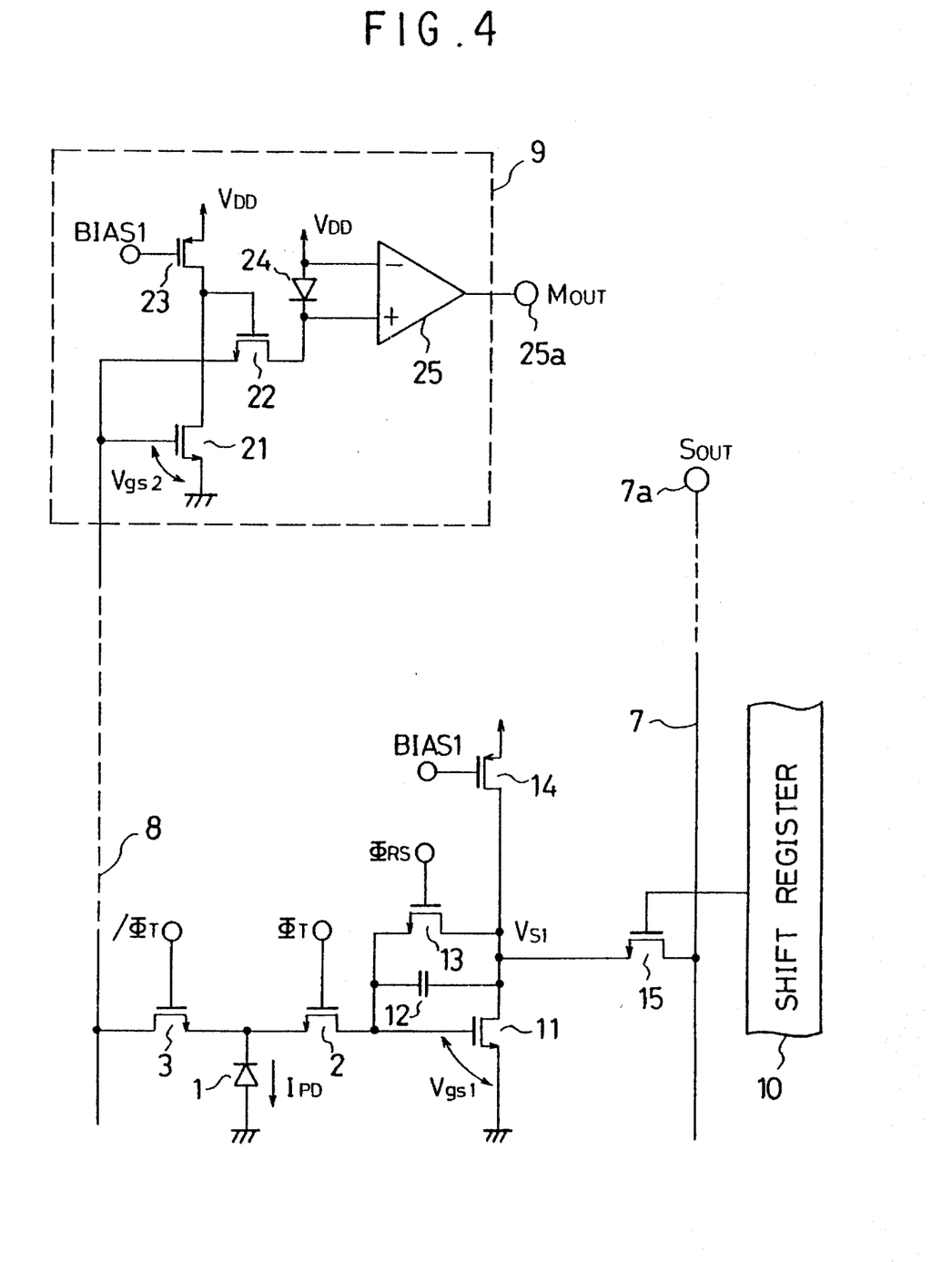
FIG. 4 shows a specific structure of the integrators and the current detector in the first embodiment of FIG. 3.

Referring to FIG. 4, the specific structure of the integrators 5 and current detector 9 shown in FIG. 3 is now discussed. As shown in FIG. 4, each integrator is constructed of a common source inverting amplifier having an nMOS transistor 11 with its source grounded and a pMOS transistor 14 functioning as a constant current source, a storage capacitor 12 connected between the input terminal of the amplifier (the gate of the nMOS transistor 11) and the output of the amplifier (the drain of the nMOS transistor 11), and a reset switching transistor 13. The feedback system formed of these components renders the input impedance of the integrator low, and the input voltage of the integrator is the gate-source voltage $V_{gs}{}^1$ of the common source nMOS transistor 11. Each cell contains the integrator thus constructed. By allowing the shift register 10 to scan, the selection switching transistors 15 are sequentially turned on one by one, and the output signal line 7 collects the output corresponding to each of the unit cells.

The other terminals of the switching transistors 3 in the unit cells 4 are connected together to the common signal line 8, which is in turn connected to a logarithmic compressing diode 24 via a transfer transistor 22 that transfers photoelectrically generated charge. The gate of the transfer transistor 22 is connected to the output terminal (the drain of an nMOS transistor 21) of the inverting amplifier constructed of the common source nMOS transistor 21 and a pMOS transistor 23 functioning as a constant current source, and the source of the transfer transistor 22 is connected to the input terminal (the gate of the nMOS transistor 21) of the inverting amplifier. For this reason, the input of the inverting amplifier, namely the common signal line 8, has the feedback from the output of the inverting amplifier, and remains at low impedance. The input voltage of the inverting amplifier is the gate-source voltage $V_{gs^2}$ of the common source nMOS transistor 21.

The drain of the transfer transistor 22 is connected to the logarithmic compressing diode 24, which compresses a photoelectrically generated current that flows through the current detecting common signal line 8. The output of the diode 24 goes to a differential amplifier 25 having a level shifting function, which gives an output signal $M_{OUT}$ at its output terminal 25a, wherein the output signal $M_{OUT}$ falls within an input range of the succeeding stage. With an A/D converter, control circuits and the like included in the succeeding state, an integrating time is computed and corresponding timings are controlled.

Figures 5A, 5B:
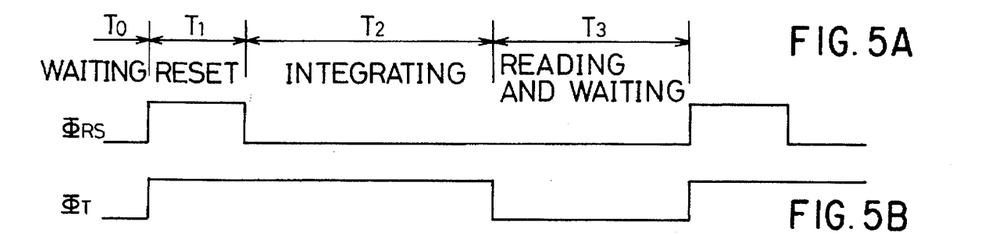
FIG. 5 is a timing diagram showing the operation of the integrators and the current detector shown in FIG. 4.
Figure 5C:
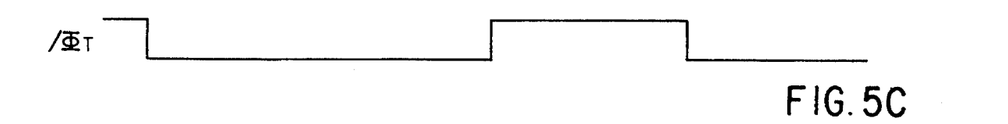
Figure 5D:
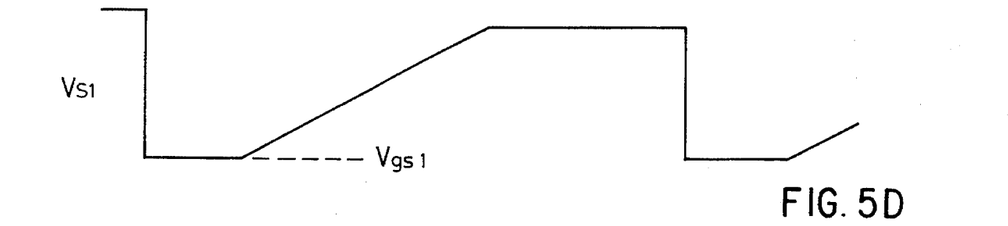

The operation of the integrators and the current detector shown in FIG. 4 is now discussed referring to the timing diagram in FIG. 5. There are four basic modes of operation: reset, integrating, reading and waiting. A duration $T_0$ in the timing diagram in FIG. 5 represents the waiting mode, during which control signal $\Phi_T$ is low and / $\Phi_T$ is high, and the photoelectrically generated current flows to the current detector 9, and the output signal $M_{OUT}$ responsive to incident light is given at the terminal 25a. This output enables the integrating time to be set. During the reset mode $T_1$, with $\Phi_T$ high and / $\Phi_T$ low, each photodiode 1 is connected to the respective integrator, and with $\Phi_{RS}$ high, the storage capacitor 12 remains reset. During the integral mode of $T_2$, $\Phi_{RS}$ is driven low, the storage capacitor 12 integrates or accumulates photoelectric charge generated by light incident to each photodiode 1, and the output $V_{s^1}$ of each integrator rises in voltage. The integrating time $T_2$ is determined by the output signal $M_{OUT}$ during $T_0$. When the integrating time has elapsed, $\Phi_T$ is driven low and / $\Phi_T$ is driven high, terminating the integrating operation. During reading and waiting mode $T_3$, the shift register 10 scans to allow the output of each integrator to appear at the output terminal 7a, while the photoelectric current flows to the current detector 9 so that the integrating time for the next cycle is determined.

The structure shown in FIG. 4 has the following feature. Since both integrators and the current detector are constructed of common source inverting amplifiers, the circuit configurations of both are operated from the same current, are suitable for low-voltage operation, and may be integrated on the same chip as a matter of course. Since brightness can be measured during $T_0$ even in a single shot operation as well as in repeated operations, optimum integrating time is set. This is suitable for use as an autofocusing sensor in camera where ranging information is needed in a single integrating operation.

Furthermore, since during the reading mode (duration $T_3$), no charge is accumulated in the photodiodes, charge is prevented from overflowing from the integrators when a strong light comes in and therefore noise attributed to such an overflow is avoided. If nMOS transistors 11, 21 are sized properly and their bias currents are properly set so that the input voltage $V_{gs^1}$ of the integrators and the input voltage $V_{gs^2}$ of the current detector are equalized, $V_{gs^1}=V_{gs^2}$, the rest time $T_1$ is shortened even with small bias current to the integrators, because the voltage applied to the photodiodes remains constant. Although perfect equalization of $V_{gs^1}=V_{gs^2}$ cannot be achieved due to variations from element to element, a difference of about 0.1 V is acceptable and gives no problems in practice.

Figure 6:
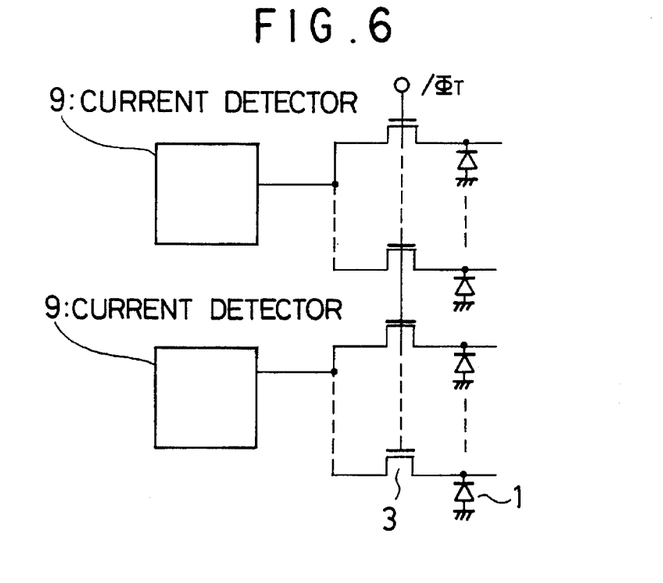
FIG. 6 shows an alternative example of the first embodiment of FIG. 3.

Besides the above feature, in the solid-state image pickup apparatus shown in FIGS. 3 and 4, the unit cell (pixel) array is easily divided into arbitrary blocks. In the embodiment in FIGS. 3 and 4, the other terminals of the switching transistors 3 are together connected to the current detector 9. The other terminals of the switching transistors 3 may be divided into a plurality of blocks, and a current detector 9 may be arranged for each block. Therefore the block division of the unit cell array is easily performed. FIG. 6 shows the case where the unit cell array is divided into two. Although FIG. 6 shows no integrators, the integrator is arranged for each photodiode in the same way as shown in FIGS. 3 and 4.

Figure 7:
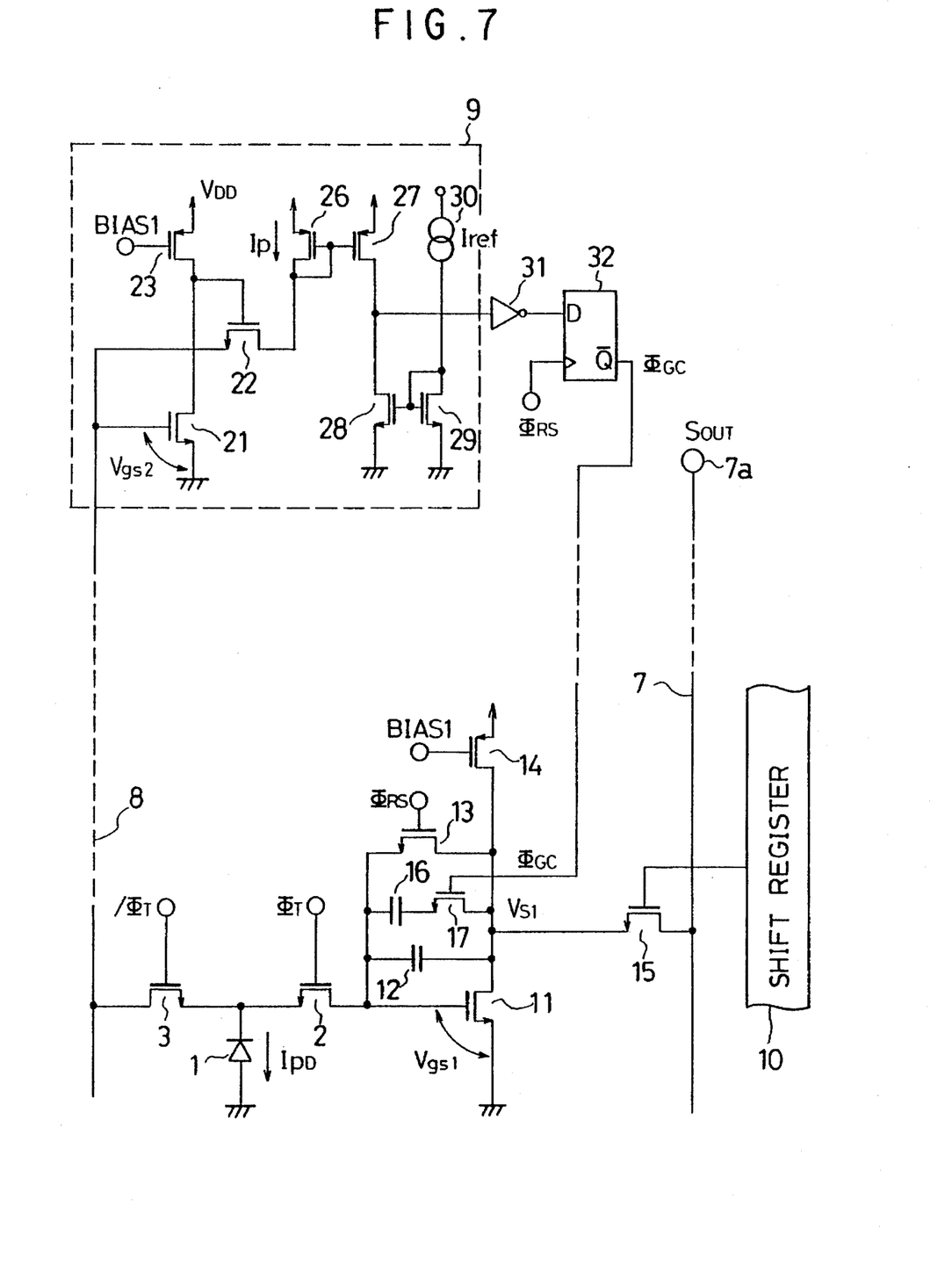
FIG. 7 is a schematic diagram showing a second embodiment of the present invention.

In the first embodiment, the logarithmically compressed output is used to perform the controlling of the integrating time. In an actual system, however, the range of integrating time has to be very wide if the system attempts to get optimum output by controlling integrating time only. Thus, it is a common practice to perform gain controlling in parallel. Referring to FIG. 7, the second embodiment featuring gain control capability is discussed.

As shown in FIG. 7, the integrator of this embodiment is constructed of a switching transistor 17 and a capacitor 16 in series connection, which is connected in parallel with the integrating capacitor 12 between the input and output of the inverting amplifier that forms the integrator in the first embodiment in FIG. 4. Assuming now that a signal $\Phi_{GC}$ applied to the gate of the switching transistor 17 is high, the capacitor 16 is connected in parallel with the storage capacitor 12, causing integrating capacity to increase and thereby lowering gain. On the other hand, when $\Phi_{GC}$ is driven low, the integrating capacity decreases, thereby raising gain.

Although the integrator thus constructed offers the same advantage as a gain control amplifier that is arranged in the output signal line 7, gain switching performed on a unit cell basis lessens more the effect of variations from unit cell to unit cell in $V_{gs^1}$ of the nMOS transistors 11. The integrator having gain switching capability is disposed on each unit cell.

The structure of the current detector in its input stage remains unchanged that of the first embodiment in FIG. 4. The second embodiment employs, instead of the logarithmic compressing diode, a current comparator that compares a reference current $I_{ref}$ with a photocurrent $I_P$. The current comparator comprises a current mirror constructed of pMOS transistors 26, 27 which fold the current corresponding to the photocurrent $I_P$, a reference current source 30 for flowing the reference current $I_{ref}$, a current mirror constructed of nMOS transistors 28, 29 that fold the current corresponding to the reference current $I_{ref}$, an inverter 31, and a D-type flipflop 32 working as a latch.

When pMOS transistors 26, 27 and nMOS transistors 28, 29 are equally sized in the current comparator constructed as above, the input to an inverter 31 is low if $I_P<I_{ref}$ and the input to the inverter 31 is high if $I_P>I_{ref}$. Dynamic range will be widened if $\Phi_{GC}$ is set be low when $I_P<I_{ref}$, or when an object is dark, and if $\Phi_{GC}$ is set to be high when $I_P>I_{ref}$, or when an object is bright. In this embodiment, in order to prevent $\Phi_{GC}$ from switching at the change of brightness during integrating time, $\Phi_{GC}$ is fed to the D-type flipflop 32 that latches $\Phi_{GC}$, in synchronism with the rising edge of $\Phi_{RS}$ he above arrangement allows gain to be automatically switched on-chip in response to brightness.

Figure 8:
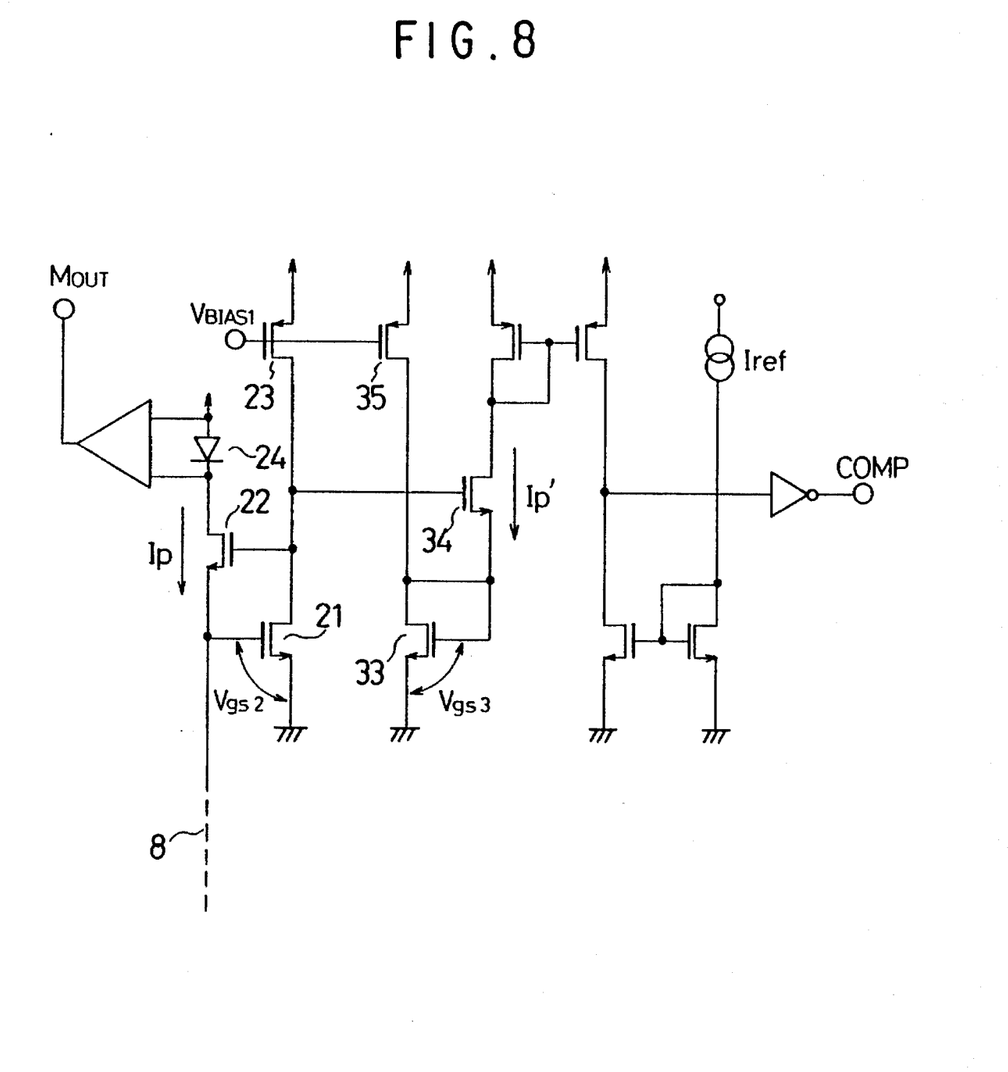
FIG. 8 is a schematic diagram showing the major portion of a third embodiment of the present invention.

Discussed next is the third embodiment that concurrently performs integral control using the logarithmically compressed output according to the first embodiment in FIG. 4 and gain (sensitivity) switching according to the second embodiment in FIG. 7. FIG. 8 shows the photocurrent detector according to the third embodiment. The photocurrent detector has the structure in which the current comparator in FIG. 7 is added to the logarithmic compressing type photocurrent detector in FIG. 4. The third embodiment is characterized in that the photocurrent $I_P$ flowing through the common signal line 8 is allowed to flow into the logarithmic compressing diode 24 via the transfer transistor 22 while the corresponding current $I_P'$ is allowed to flow the current comparator.

In FIG. 8, a pMOS transistor 35 gives bias current to an nMOS transistor 33, the gate and drain of which are short-circuited. The bias current corresponds to a current $I_{BIAS}$ that flows through the nMOS transistor 21, because the gate of the pMOS transistor 35 is connected to the gate of the pMOS transistor 23. If pMOS transistors 23, 35 are equally sized and if nMOS transistors 21, 33 are equally sized, $I_{BIAS}+I_P'$ flows through the nMOS transistor 33. If the bias current is set to be sufficiently large compared to $I_P'$, the relationship $V_{gs}2=V_{gs}3$ is assured. $V_{gs}3$ is the between the gate and source of the nMOS transistor 33.

Since the gate of an nMOS transistor 34 is connected to the gate of the nMOS transistor 22 at the same node, the voltage between source and gate of the nMOS transistor 22 is nearly equal to the voltage between source and gate of the nMOS transistor 34. Therefore, the current $I_P'$ that flows through the nMOS transistor 34 becomes equal to $I_P$, and $I_P'$ is used for current comparison.

By using the current detector of the third embodiment, determination of integrating time and switching of gain may be performed concurrently. Therefore, even if the setting of integrating time permissible is limited to a narrow range, a wide range of brightness can be handled.

Each of the above embodiments has been discussed with reference to the one-dimensional sensor. The one-dimensional sensor offers the advantage that the photodiodes and the integrators may be prevented from being saturated with photocurrents by applying the control signal and its inverted control signal to the two switching transistors that are connected to the photodiode.

Figure 9:
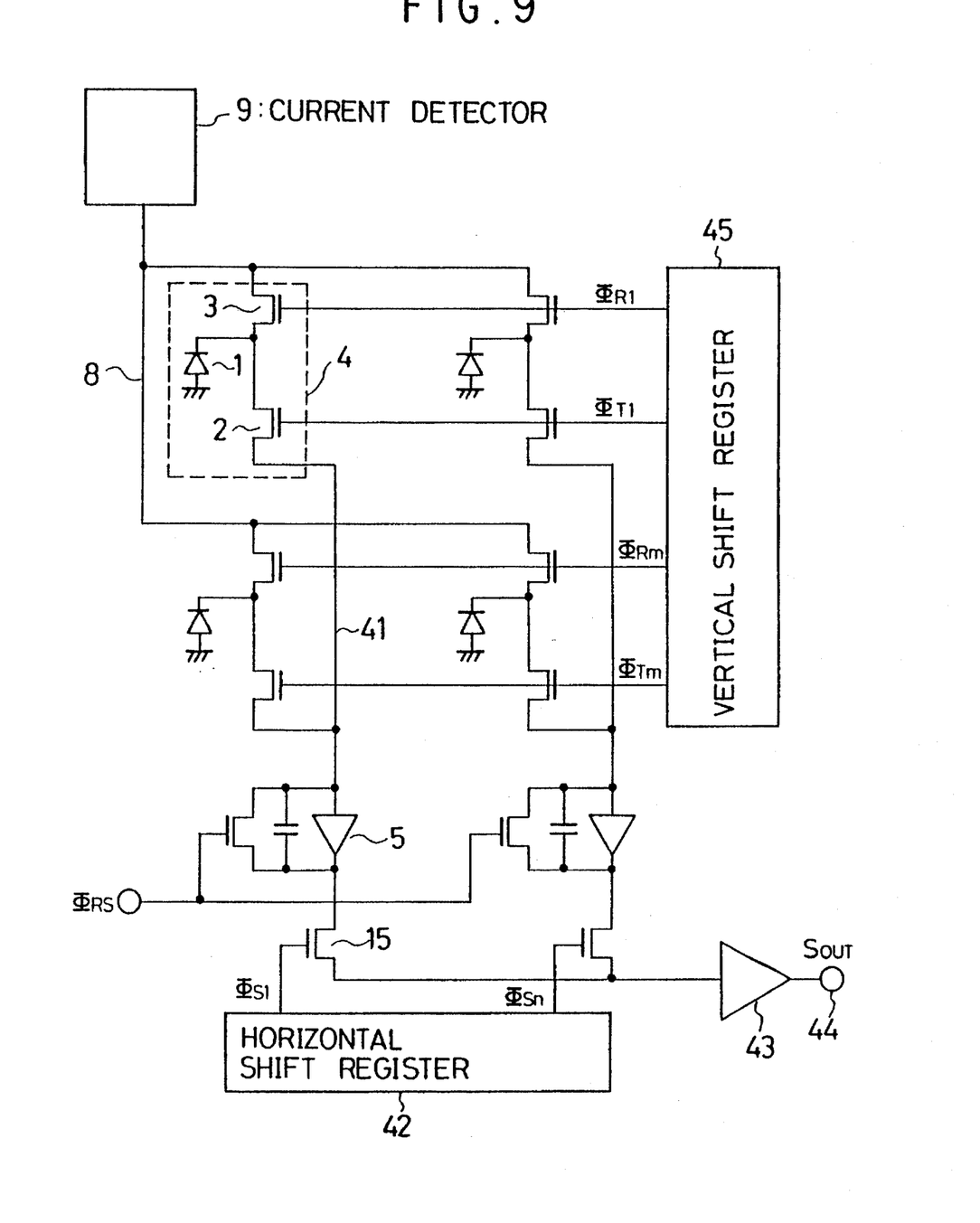
FIG. 9 is a schematic diagram showing a fourth embodiment of the present invention.
Figure 10A:
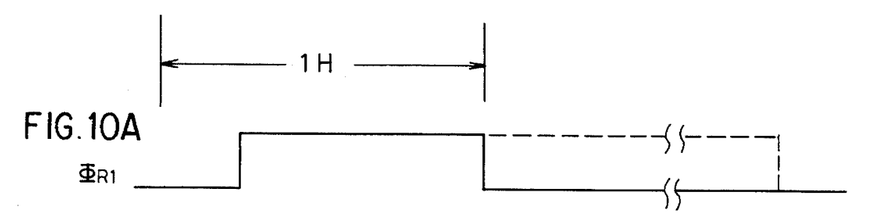
FIG. 10 is a timing diagram showing the operation of the fourth embodiment shown in FIG. 9.
Figure 10B:
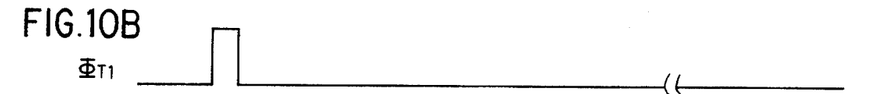
Figure 10C:
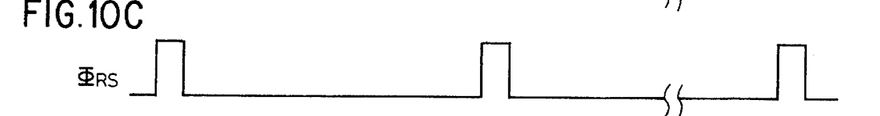
Figure 10D:
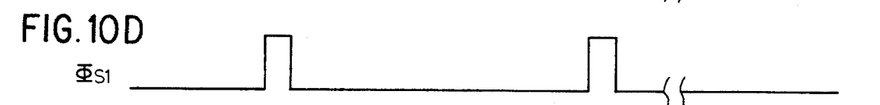
Figure 10E:
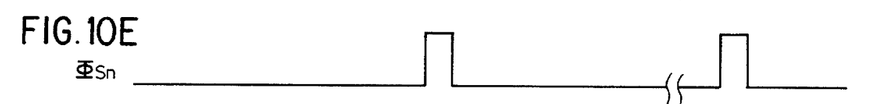
Figure 10F:
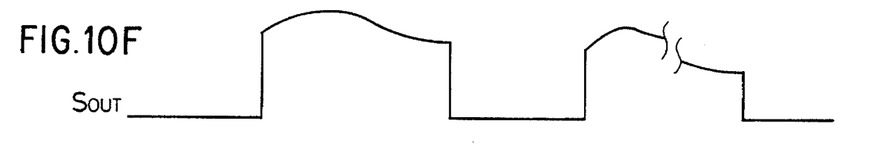

Referring to FIG. 9, the fourth embodiment is discussed. The fourth embodiment relates to an area sensor in which unit cells are two-dimensionally arranged. As shown in FIG. 9, the unit cell 4 is constructed of a photodiode 1 and two switching transistors 2, 3 with one terminal of each connected to the photodiode 1 in the same way as the first embodiment in FIG. 3. The unit cells thus constructed are two-dimensionally arranged to form a unit cell array. The other terminals of the switching transistors 2 on each column are commonly connected to a vertical signal line 41, and each vertical signal line 41 is connected to the integrator 5 that has the same structure as the first embodiment shown in FIG. 3. The output of each integrator 5 is read as an output $S_{OUT}$ at an output terminal 44 via a buffer 43 by causing a horizontal shift register 42 to scan. The structure of the integrator 5 remains identical to the ones shown in FIGS. 3 and 4 or FIG. 7. The difference from the line sensor in the preceding embodiments is that the integral operation of photoelectric charge is performed by each photodiode itself and integrated charge is detected by the integrator 5. In this sense, the integrator 5 in this embodiment functions as a charge detector rather than an integrator.

The other terminals of the switching transistors 3 on the unit cells are all together connected to the common signal line 8, which is in turn connected to the photoelectric detector 9. The two switching transistors 2, 3 are controlled on a row-by-row basis by pulses $\Phi_{Ri}, \Phi_{Ti}$ (i=1, 2, ..., m), which are provided by a vertical shift register 45 when it scans. The photocurrent detector 9 has the same structure as those shown in FIGS. 4, 7, and 8.

The operation of the fourth embodiment thus constructed is discussed referring to the timing diagram in FIG. 10. Suppose now that each of the switching transistors 2, 3 is conductive when a high level control signal is applied to its control electrode, and is non-conductive when a low level control signal is applied. To read the unit cells (pixels) on the first row, $\Phi_{RS}$ is driven high to reset the integrators 5. Then, $\Phi_{RS}$ is driven low, followed by a high $\Phi_{T^1}$. The photoelectric charge accumulated in each of the unit cells on the first row is transferred to the respective integrator 5. The output terminal of each integrator 5 holds the output corresponding to the charge accumulated in the respective unit cell. Next, $\Phi_{T^1}$ is driven low, and the horizontal shift register 42 scans to read the output from each integrator 5. During reading period, efficient reading of photocurrent will be performed if $\Phi_{R^1}$ is kept high.

The above operation is performed in one horizontal scanning period. To assure compatibility with television video signal, driving $\Phi_{RS}$ high and $\Phi_{T^1}$ high may be performed during horizontal blanking period. The above operation is repeated on all rows while the vertical shift register 45 scans. The accumulation time of a unit cell on the first row is the duration from the moment $\Phi_{R^1}$ shifts from high to low to the moment $\Phi_{T^1}$ shifts to high. To vary the accumulation time, the timing of the falling edge of $\Phi_{R^1}$ may be changed. When $\Phi_{R^1}$ shown in the timing diagram in FIG. 10 is modified as shown by the dotted line, the integrating (accumulation) time is shortened.

In the fourth embodiment in FIG. 9, the other terminals of the switching transistors 3 that constitute each unit cell 4 are commonly connected to the single current detector 9 that covers all unit cells. The unit cell array may be divided into a plurality of blocks, and current detectors may be arranged on a block-by-block basis.

Figure 11:
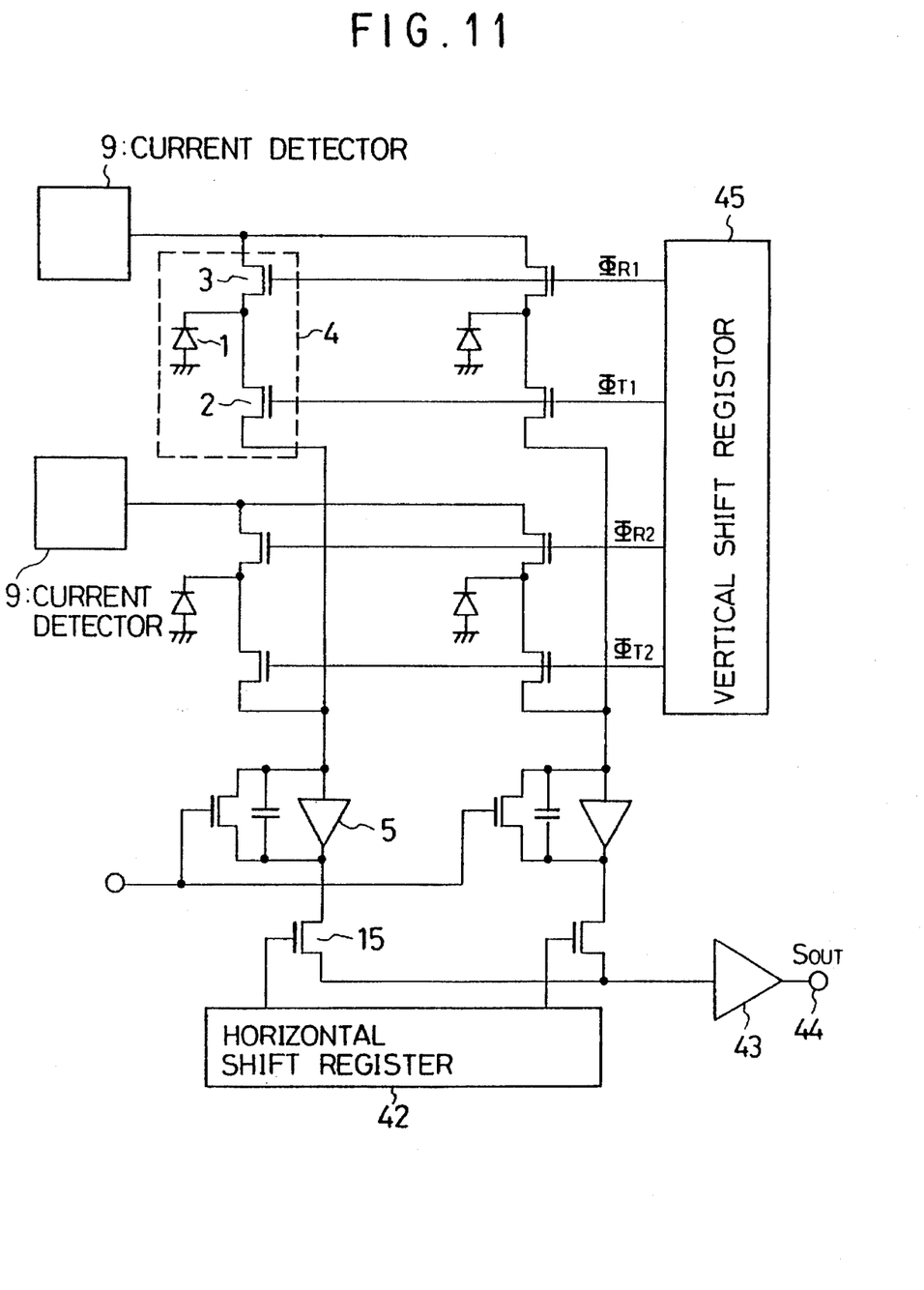
FIG. 11 is a schematic diagram showing a fifth embodiment of the present invention.

FIG. 11 shows the fifth embodiment in which a current detector is disposed on each row. By arranging a current detector on each row as shown, information about brightness variations from row to row is collected when photocurrents from a plurality of rows are detected.

In the fourth and fifth embodiments, respectively shown in FIGS. 9 and 11, integrating time may be controlled in the same way as in the line sensor. The integrators 5 connected to the vertical signal lines may be structured so that gain switching is performed as in the arrangement shown in FIG. 7. Thus, gain switching is concurrently performed, thereby resulting in a wide dynamic range.

The fourth and fifth embodiments, respectively shown in FIGS. 9 and 11, employ a standard method in which the vertical scanning circuit 45 scans periodically. By substituting a decoder for the vertical shift register 45 in FIGS. 9 and 11, the arrangement is used as a line sensor that offers variable vertical range of image sensing.

With such a decoder employed, one of $\Phi_{R^1}$ and $\Phi_{T^1}$ is set to be high and the other is set to be low so that integral operation is performed on each column on a particular vertical portion, and on the rest of the array, photocurrents are drained into the current detectors 9. Thus, brightness information is obtained while smear and blooming are prevented.

In the above arrangement, more useful information will be obtained if brightness is sensed on a row-by-row basis as shown in FIG. 11. For example, the range of integration is determined by detecting current on each row in the first place.

In the method where the range of integration is determined using the decoder, the integrating time and gain may be determined based on the information from the current detectors as in each of the above embodiments. In addition, when employed, the decoder permits another controlling where the number of rows involved in the integral operation of integrators is varied according to brightness. For example, when an object is bright enough, one row only is integrated by an integrator. When it is getting darker, more rows are integrated. Such an arrangement allows the apparatus to handle a wide range of brightness.

As the embodiments have been discussed, according to the present invention, the current detector for detecting an averaged brightness on the unit cell array is integrated on-chip with the unit cell array for detecting the integrated value on a unit cell basis, and the integrators and the current detector are operated from the same power supply, and the unit cell array can be divided into a plurality of block. The line sensor arranged according to the present invention prevents the photodiodes constituting each unit cell from saturating.

What is claimed is:

1. A solid-state image pickup apparatus comprising a unit cell array formed of unit cells arranged one-dimensionally, each unit cell having a photodiode, and first and second switches, a first terminal of each switch connected to the photodiode, integrators connected to second terminals of the first switches of the unit cells for detecting the integrated value of the charge generated by the incident light into the photodiodes, a common signal line connected commonly to second terminals of the second switches of the unit cells, and a single current detector connected to the common signal line for detecting, as a current value, the charge generated by light incident to the unit cell array.

2. The solid-state image pickup apparatus according to claim 1, wherein control terminals of the first switches of the unit cells are commonly connected, control terminals of the second switches of the unit cells are commonly connected, the control terminals of the first switches are supplied with an inverted signal of a control signal that is fed to the control terminals of the second switches, the integrators connected respectively to the first switches and the current detector commonly connected to the second switches are each constructed of a feedback type circuit having low input impedance and approximately equal input voltage.

3. The solid-state image pickup apparatus according to claim 1 or 2, wherein each of the said integrators is so constructed that the gain of the integrator is switched by a gain switching control signal, and the gain switching control signal is set according to the current value detected by the current detector.

4. The solid-state image pickup apparatus according to claim 1, wherein said current detector is of a logarithmic compression type and the output of the current detector controls the integrating time of the integrators.

5. The solid-state image pickup apparatus according to claim 2, wherein said current detector is of a logarithmic compression type and the output of the current detector controls the integrating time of the integrators.

6. The solid-state image pickup apparatus according to claim 3, wherein said current detector is of a logarithmic compression type and the output of the current detector controls the integrating time of the integrators.

7. A solid-state image pickup apparatus comprising a unit cell array formed of unit cells arranged one-dimensionally, each unit cell having a photodiode, and first and second switches, a first terminal of each switch connected to the photodiode, integrators connected to second terminals of the first switches of the unit cells for detecting the integrated value of the charge generated by the incident light into the photodiodes, a plurality of common signal lines connected to the second terminals of the second switches of the unit cells commonly on a block-by-block basis with the unit array divided into a plurality of blocks, and current detectors connected respectively to the common signal lines for detecting, as current values, on a block-by-block basis, the charge generated by incident light.

8. The solid-state image pickup apparatus according to claim 7, wherein control terminals of the first switches in the unit cells are commonly connected, the control terminals of the second switches in the unit cells are commonly connected, the control terminals of the first switches are supplied with an inverted signal of a control signal that is fed to the control terminals of the second switches, the integrators connected respectively to the first switches and the current detectors connected to the second switches commonly on a block-by-block basis are each constructed of a feedback type circuit having low input impedance and approximately equal input voltage.

9. The solid-state image pickup apparatus according to claim 7 or 8, wherein each of the said integrators is so constructed that the gain of the integrator is switched by a gain switching control signal, and the gain switching control signal is set according to the current value detected by the current detector.

10. The solid-state image pickup apparatus according to claim 7, wherein said current detector is of a logarithmic compression type and the output of the current detector controls the integrating time of the integrators.

11. The solid-state image pickup apparatus according to claim 8, wherein said current detector is of a logarithmic compression type and the output of the current detector controls the integrating time of the integrators.

12. The solid-state image pickup apparatus according to claim 9, wherein said current detector is of a logarithmic compression type and the output of the current detector controls the integrating time of the integrators.

13. A solid-state image pickup apparatus comprising a unit cell array formed of unit cells arranged two-dimensionally, each unit cell having a photodiode, and first and second switches, a first terminal of each switch connected to the photodiode, a plurality of vertical signal lines, each connected commonly to second terminals of first switches of the unit cells that are arranged in each vertical column, integrators connected respectively to the vertical signal lines for detecting the integrated value of the charge generated by the incident light into the photodiodes, a common signal line connected commonly to second terminals of the second switches of the unit cells, and a single current detector connected to the common signal line for detecting, as a current value, the charge generated by light incident to the unit cell array.

14. The solid-state image pickup apparatus according to claim 13, wherein control terminals of the first switches of the unit cells arranged in each horizontal row of the unit cell array are connected commonly row by row to a shift register that scans vertically, and control terminals of the second switches of the unit cells arranged in each horizontal row of the unit cell array are connected commonly row by row to the shift register that scans vertically.

15. The solid-state image pickup apparatus according to claim 13 or 14, wherein the integrating time from the moment the second switch is turned off to the moment the first switch is turned on in each unit cell is set according the output of the current detector.

16. The solid-state image pickup apparatus according to claim 13, wherein each of said integrators connected to the respective vertical signal line is so constructed that the gain of the integrator is switched according to the output of the current detector.

17. The solid-state image pickup apparatus according to claim 14, wherein each of said integrators connected to the respective vertical signal line is so constructed that the gain of the integrator is switched according to the output of the current detector.

18. The solid-state image pickup apparatus according to claim 15, wherein each of said integrators connected to the respective vertical signal line is so constructed that the gain of the integrator is switched according to the output of the current detector.

19. A solid-state image pickup apparatus comprising a unit cell array formed of unit cells arranged two-dimensionally, each unit cell having a photodiode, and first and second switches, a first terminal of each switch connected to the photodiode, a plurality of vertical signal lines, each connected commonly to second terminals of first switches of the unit cells that are arranged in each vertical column, integrators connected respectively to the vertical signal lines for detecting the integrated value of the charge generated by the incident light into the photodiodes, a plurality of common signal lines connected to second terminals of the second switches of the unit cells commonly on a block-by-block basis with the unit array vertically divided into a plurality of blocks, and current detectors connected respectively to the common signal lines for detecting, as current values, on a block-by-block basis, the charge generated by incident light.

20. The solid-state image pickup apparatus according to claim 19, wherein control terminals of the first switches of the unit cells arranged in each horizontal row of the unit cell array are connected commonly row by row to a shift register that scans vertically, and control terminals of the second switches of the unit cells arranged in each horizontal row of the unit cell array are connected commonly row by row to the shift register that scans vertically.

21. The solid-state image pickup apparatus according to claim 19 or 20, wherein the integrating time from the moment the second switch is turned off to the moment the first switch is turned on in each unit cell is set according the output of the current detector.

22. The solid-state image pickup apparatus according to claim 19, wherein each of said integrators connected to the respective vertical signal line is so constructed that the gain of the integrator is switched according to the output of the current detector.

23. The solid-state image pickup apparatus according to claim 20, wherein each of said integrators connected to the respective vertical signal line is so constructed that the gain of the integrator is switched according to the output of the current detector.

24. The solid-state image pickup apparatus according to claim 21, wherein each of said integrators connected to the respective vertical signal line is so constructed that the gain of the integrator is switched according to the output of the current detector.

25. The solid-state image pickup apparatus according to claim 19, wherein control terminals of the first switches of the unit cells arranged in each horizontal row of the unit cell array are connected commonly row by row to a decoder, and control terminals of the second switches of the unit cells arranged in each horizontal row of the unit cell array are connected commonly row by row to the decoder.

26. The solid-state image pickup apparatus according to claim 19 or 25, wherein the first switches in the unit cells are so constructed that the first switches are controlled by a plurality of horizontal rows in the unit cell array, and the number of the plurality of horizontal rows is set according to each of the outputs of the plurality of current detectors.

* * * * *